(12) United States Patent
Oomura et al.

(10) Patent No.: US 6,940,656 B2
(45) Date of Patent: Sep. 6, 2005

(54) LARGE ZOOM RATIO, FOUR-GROUP ZOOM LENS

(75) Inventors: Makoto Oomura, Ina Machi (JP); Nobuaki Toyama, Saitama (JP)

(73) Assignee: Fujinon Corporation, Saitama (JP)

( * ) Notice: Subject to any disclaimer, the term of this patent is extended or adjusted under 35 U.S.C. 154(b) by 5 days.

(21) Appl. No.: 10/778,187

(22) Filed: Feb. 17, 2004

(65) Prior Publication Data

US 2004/0169934 A1 Sep. 2, 2004

(30) Foreign Application Priority Data

Feb. 28, 2003 (JP) ........................................ 2003-053498

(51) Int. Cl.[7] .............................................. G02B 15/14
(52) U.S. Cl. ...................... 359/687; 359/686; 359/676
(58) Field of Search ................................ 359/676, 677, 359/683, 686, 687; 348/240.99

(56) References Cited

U.S. PATENT DOCUMENTS 5,790,316 A * 8/1998 Terasawa et al. ........... 359/687

FOREIGN PATENT DOCUMENTS

JP  2001-183584  7/2001

* cited by examiner

Primary Examiner—Hung Xuan Dang
Assistant Examiner—Joseph Martinez
(74) Attorney, Agent, or Firm—Arnold International; Jon W. Henry; Bruce Y. Arnold (57) ABSTRACT

A large zoom ratio, four-group zoom lens formed of only four lens groups is disclosed, namely, a first lens group of positive refractive power, a second lens group of negative refractive power, and third and fourth lens groups of positive refractive power. The first lens group includes, in order from the object side, a first lens subgroup that is fixed during focusing and a second lens subgroup that moves during focusing. The first lens group includes, from the object side, a first lens element and positive second, third, fourth, and fifth lens elements. To suppress spherical aberration, on-axis chromatic aberration, and distortion, specified conditions are satisfied for the refractive index, Abbe number, and radii of curvature of the object side lens element, the size of the image on the image plane, and the difference in Abbe numbers of the object side lens element and the lens element adjacent it.

20 Claims, 4 Drawing Sheets

Spherical Aberration
Fig. 3A

Astigmatism
Fig. 3B

Distortion
Fig. 3C

Lateral Color
Fig. 3D

Spherical Aberration
Fig. 3E

Astigmatism
Fig. 3F

Distortion
Fig. 3G

Lateral Color
Fig. 3H

Spherical Aberration
Fig. 4A

Astigmatism
Fig. 4B

Distortion
Fig. 4C

Lateral Color
Fig. 4D

Spherical Aberration
Fig. 4E

Astigmatism
Fig. 4F

Distortion
Fig. 4G

Lateral Color
Fig. 4H

US 6,940,656 B2

LARGE ZOOM RATIO, FOUR-GROUP ZOOM LENS

BACKGROUND OF THE INVENTION

Zoom lenses used in television cameras for broadcasting need to satisfy certain conditions associated with the use of a solid-state image pickup device, such as a CCD, and at the same time they need to have high performance over the entire range of zoom, the entire range of focusing, and over the entire image plane. In addition, there is an increasing demand for zoom lenses with high magnification, very large zoom ratios and very wide, wide-angle views.

Japanese Laid-Open Patent Application 2001-183584, for example, has been proposed to meet these requirements. The zoom lens of this Japanese patent application consists of four lens groups, namely, in order from the object side, a focusing lens group, a variator lens group, a compensator lens group, and a relay lens group, and has a zoom ratio of 66 and a field angle of 58°.

However, the zoom lens of this Japanese patent application does not meet the need for a zoom lens with a zoom ratio larger than 90 that has developed in recent years. Also, the zoom lens of this Japanese patent application does not meet the need for angles of view that are wider than those of conventional wide-angle zoom lenses. These needs are expected to be met without sacrificing high optical performance anywhere within the entire range of zoom, within the entire range of focus, or over the entire image plane. As state-of-the-art broadcasting systems such as high definition broadcasting systems become more common, aberrations and fluctuations in aberrations at the telephoto end during zooming and due to focusing especially need to be minimized. Among aberrations, on-axis chromatic aberration, spherical aberration and the fluctuations in the absolute values of the aberrations must be minimized or it becomes very difficult to obtain high resolution imaging.

BRIEF SUMMARY OF THE INVENTION

The present invention relates to a zoom lens having high magnification, an extremely large zoom ratio, and high performance with favorable correction of on-axis chromatic aberration and spherical aberration over the entire range of zoom and over the entire range of focus. More specifically, the present invention relates to such a zoom lens for mounting in cameras, particularly video cameras, that may have a zoom ratio larger than 90.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
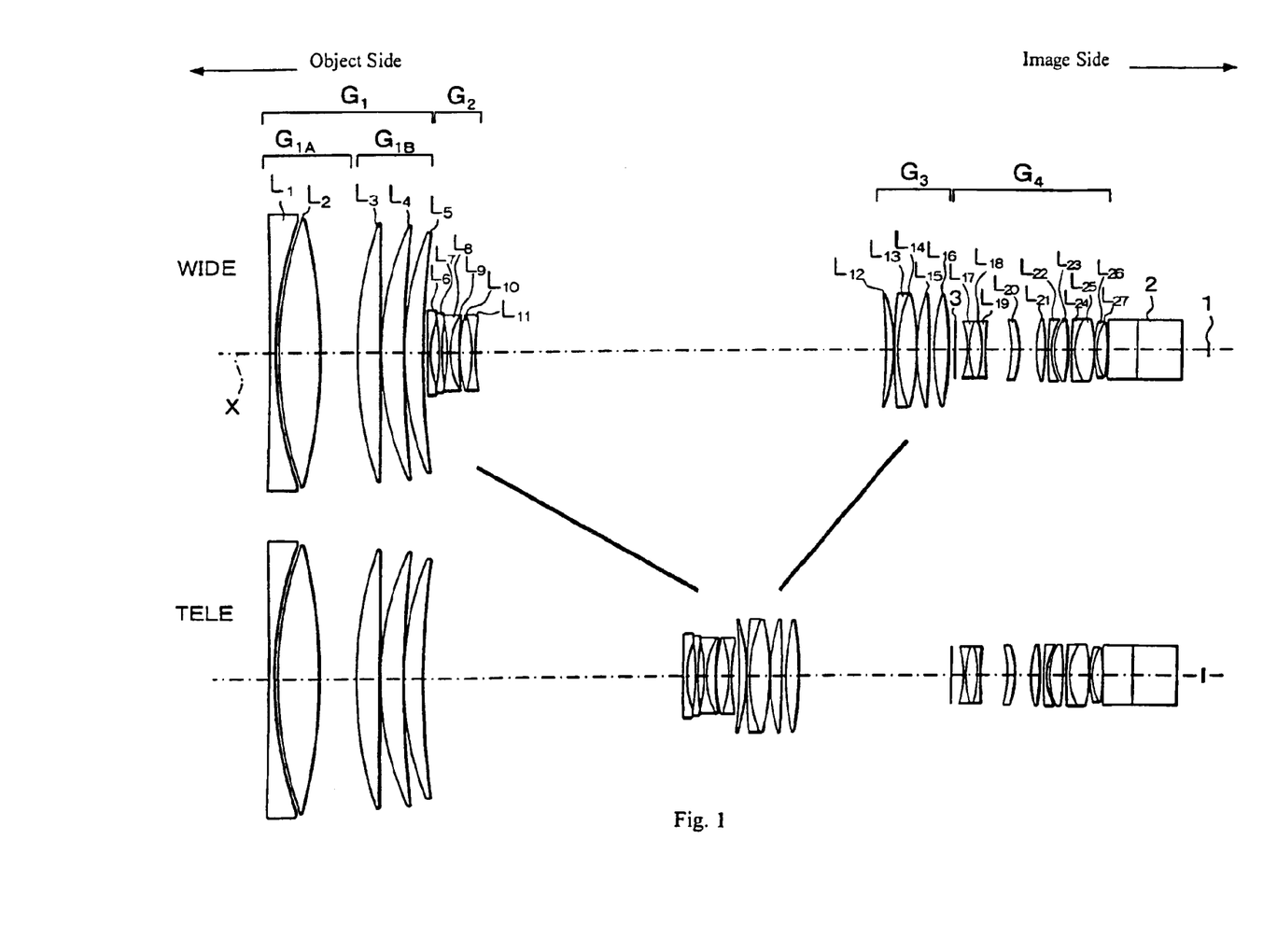
FIG. 1 shows cross-sectional views of Embodiment 1 of the present invention at the wide-angle end (WIDE) and at the telephoto end (TELE)
Figure 2:
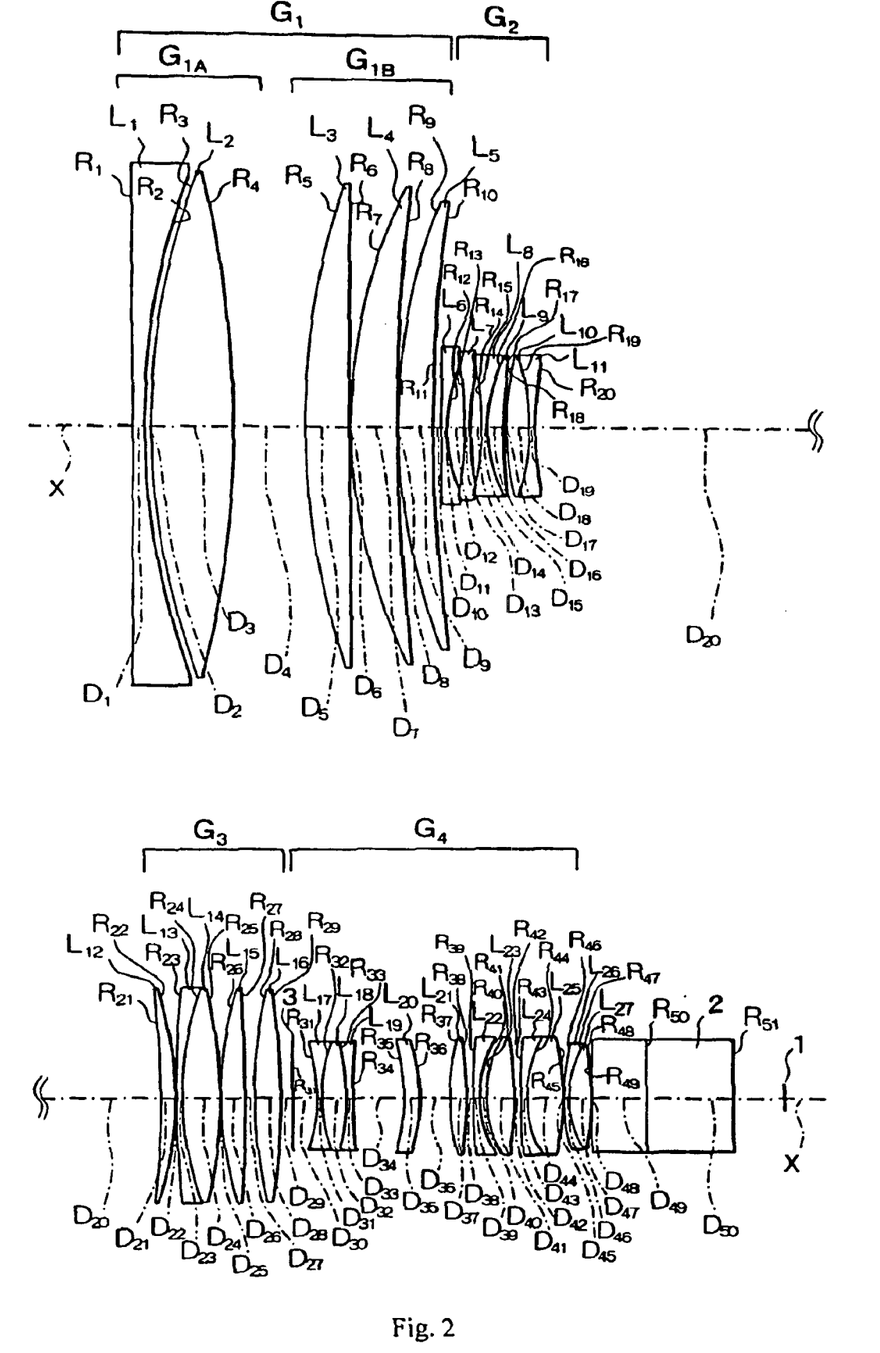
FIG. 2 shows a detailed cross-sectional view of Embodiment 1 of the zoom lens of the present invention at the wide-angle end.

A general description of the preferred embodiments of the zoom lens of the present invention will now be described with reference to FIGS. 1 and 2 that show Embodiment 1. FIG. 1 shows cross-sectional views of Embodiment 1 of the present invention at the wide-angle end (WIDE) and at the telephoto end (TELE). The straight lines in FIG. 1 indicate the movement of lens groups $G_2$ and $G_3$ when zooming between the two illustrated zoom settings. Lens groups $G_1$ and $G_4$ remain stationary during zooming. FIG. 2 shows a detailed cross-sectional view of Embodiment 1 of the zoom lens of the present invention at the wide-angle end. In FIG. 1 and FIG. 2, lens groups are referenced by the letter G with a subscript denoting their order from the object side of the zoom lens, from $G_1$ to $G_4$, and with lens group $G_1$ being further divided, in order from the object side, into a first lens subgroup $G_{1A}$ and a second lens subgroup $G_{1B}$. Similarly, in FIG. 1 and FIG. 2, lens elements are referenced by the letter L with a subscript denoting their order from the object side, from $L_1$ to $L_{27}$. Similarly, in FIG. 2, the radii of curvature of the optical surfaces of all the optical elements, including the surfaces of a color separating optical system 2, such as a prism system, are referenced by the letter R with a subscript denoting their order from the object side of the zoom lens, from $R_1$ to $R_{51}$. The on-axis surface spacings along the optical axis X of all the optical element surfaces are referenced by the letter D with a subscript denoting their order from the object side of the zoom lens, from $D_1$ to $D_{50}$.

The definitions of the terms "lens element," lens component," "lens group," and "lens subgroup" that relate to the descriptions above and the following detailed description are as follows. The term "lens element" is herein defined as a single transparent mass of refractive material having two opposed refracting surfaces that are positioned at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified. At intermediate stages of evaluation, a lens group may be divided into smaller organizations of lens components that may be identified as "lens subgroups" of a particular lens group.

As shown in FIGS. 1 and 2, the large zoom ratio, four-group zoom lens of the present invention includes, in order from the object side, a first lens group $G_1$ of positive refractive power that is fixed during zooming, a second lens group $G_2$ of negative refractive power that is moved during zooming so as to vary the focal length of the zoom lens, a third lens group $G_3$ of positive refractive power that is moved during zooming in order to suppress what would otherwise be a shift in the image plane along the optical axis during zooming, and a fourth lens group $G_4$ of positive refractive power that is fixed during zooming. The large zoom ratio, four-group zoom lens is constructed so that the second lens group $G_2$ and the third lens group $G_3$ approach each other when zooming from the wide-angle end to the telephoto end. The light flux that enters from the object side along the optical axis X is imaged at image plane 1 onto a solid-state image detecting device (not shown), such as a CCD, that is used to capture the image.

In the following descriptions, references will be frequently made to a "lens element." However, as set forth above, it is understood that numerous of the lens elements described below are also lens components and may be replaced by lens components that include more than one lens element.

The large zoom ratio, four-group zoom lens of the invention satisfies the following conditions:

$L/f_w > 1.17$  Condition (1)

$N_{L1} > 1.75$  Condition (2)

$v_{L1} > 38$  Condition (3)

where

L is the distance between two points of an image formed by the zoom lens on the image plane 1 of the zoom lens that are diametrically opposite each other with respect to the optical axis X of the zoom lens, $f_w$ is the focal length of the zoom lens at the wide-angle end, $N_{L1}$ is the refractive index at the e-line (546.1 nm) of the material of the object side lens element of the zoom lens, and $V_{L1}$ is the Abbe number at the d-line (587.6 nm) of the material of the object side lens element of the zoom lens.

Condition (1) helps determine the wide-angle setting of the zoom lens. Conditions (2) and (3) limit the lens materials that can be used for the object side lens element of the zoom lens. In general, a lens with a relatively small Abbe number is used for the lens element having negative refractive power in the first lens group $G_1$, which is the object side lens element of the zoom lens of the disclosed embodiments of the present invention. However, with the zoom lens of the present invention, on-axis chromatic aberration, specifically at the telephoto end, is favorably corrected by requiring that the lens material of this lens element have a relatively large Abbe number. In fact, it is important to satisfy both Conditions (2) and (3) in order to favorably correct spherical aberration and on-axis chromatic aberration because the spherical aberration increases when Condition (2) is not satisfied and on-axis chromatic aberration increases when Condition (3) is not satisfied.

By configuring a zoom lens of the present invention as described above, a large zoom ratio, four-group zoom lens that is capable of zoom ratios of 90 to approximately 100 can be achieved while favorably correcting on-axis chromatic aberration and spherical aberration and having high performance over the entire range of zoom and over the entire range of focus.

Also, preferably the following condition is satisfied:

$-0.5 < (R_1 + R_2)/(R_1 - R_2) < 1.0$  Condition (4)

where, $R_1$ is the radius of curvature of the lens surface on the object side of the object side lens element of the zoom lens, and $R_2$ is the radius of curvature of the lens surface on the image side of the object side lens element of the zoom lens.

If the ratio of Condition (4) is smaller than the lower limit of Condition (4), the distortion increases, and if the ratio of Condition (4) is larger than the upper limit of Condition (4), the spherical aberration increases.

In the large zoom ratio, four-group zoom lens of the present invention, the tolerances in the values of the radii of curvature, lens element thicknesses, air spacings, and refractive indices of the lens elements of the first lens group $G_1$ are small. Especially, deviations from the prescribed values, which may occur due to manufacturing variables, of the first lens element $L_1$ on the object side of the zoom lens affect the optical performance of the zoom lens as a whole. Therefore, it is important to define the shape of the first lens element $L_1$ in order to minimize errors introduced in the manufacture of the zoom lens.

Additionally, preferably the following Condition (5) is satisfied:

$v_{L2} - v_{L1} < 55$  Condition (5)

where $v_{L1}$ is the Abbe number at the d-line (587.6 nm) of the material of the object side lens element of the zoom lens, and $v_{L2}$ is the Abbe number at the d-line (587.6 nm) of the material of the second lens element from the object side of the zoom lens.

Condition (5) relates to the first lens element $L_1$ and the second lens element $L_2$ of the first lens group $G_1$. By satisfying Condition (3) above, which also relates to the first lens element $L_1$, and further satisfying Condition (5), on-axis aberration is further favorably corrected. In general, an extremely dispersive material is used for each of the second lens element $L_2$ and the lens elements on the image side of the second lens element $L_1$ in the first lens group $G_1$ in order for Condition (5) to be especially effective in favorably correcting on-axis aberration.

Additionally, in the zoom lens of the present embodiment, the first lens group $G_1$ preferably consists of five lens elements, in order from the object side, a first lens element $L_1$, and four lens elements $L_2$–$L_5$ having positive refractive power. With this configuration, the first lens group $G_1$, which generally includes large diameter lens elements and is heavy, can be made with smaller diameter lenses that are lighter in weight while still reducing spherical aberration and on-axis chromatic aberration.

In this manner, in accordance with the large zoom ratio, four-group zoom lens of the present invention, various aberrations are favorably corrected for images of both distant and nearby objects over the entire, very large, range of zoom, so as to achieve consistently high resolution and high contrast at all image distances.

Embodiments 1 and 2 of the present invention will now be individually described with further reference to the drawings.

Embodiment 1

In Embodiment 1, as shown in FIGS. 1 and 2, the first lens group $G_1$ includes, in order from the object side: a first lens element $L_1$ that is biconcave having surfaces of different curvature and with its surface of greater curvature on the image side; a second lens element $L_2$ that is biconvex having surfaces of different curvature and with its surface of greater curvature on the object side; and third, fourth, and fifth lens elements $L_3$, $L_4$, and $L_5$, respectively, each having positive refractive power and a meniscus shape with its convex surface on the object side. In the first lens group $G_1$, the first lens element $L_1$ and the second lens element $L_2$ form a first lens subgroup $G_{1A}$ that is fixed during focusing. The third lens element $L_3$, the fourth lens element $L_4$, and the fifth lens element $L_5$ form a second lens subgroup $G_{1B}$ that is moved as a unit during focusing.

The second lens group $G_2$ includes, in order from the object side: a sixth lens element $L_6$ of negative refractive power and a meniscus shape with its convex surface on the object side; a seventh lens element $L_7$ that is biconcave having surfaces of different curvature and with its surface of greater curvature on the image side; a doublet component formed of an eighth lens element $L_8$ that is biconcave having surfaces of different curvature and with its surface of greater curvature on the image side intimately bonded to a ninth lens element $L_9$ of positive refractive power and a meniscus shape with its convex surface on the object side; and, a doublet component formed of a tenth lens element $L_{10}$ that is biconvex having surfaces of different curvature and with its surface of greater curvature on the image side intimately bonded to an eleventh lens element $L_{11}$ that is biconcave having surfaces of different curvature and with its surface of greater curvature on the object side. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lens elements together, the latter being commonly referred to as a "cemented" lens element arrangement.

Based on the definitions of "lens component" and "intimately bonded" above, it is clear that the doublets described above are lens components. However, to emphasize the nature of these doublets being lens components, the doublets are described as doublet components.

The third lens group $G_3$ includes, in order from the object side: a twelfth lens element $L_{12}$ of positive refractive power and a meniscus shape with its convex lens surface on the image side; a doublet component formed of a thirteenth lens element $L_{13}$ having negative refractive power and a meniscus shape with its concave lens surface on the image side intimately bonded to a fourteenth lens element $L_{14}$ that is biconvex having surfaces of different curvature and with its surface of greater curvature on the object side; and fifteenth and sixteenth lens element $L_{15}$ and $L_{16}$, respectively, each being biconvex with surfaces of different curvature and the surface of greater curvature on the object side.

The fourth lens group $G_4$ includes, in order from the object side: a triplet formed of a seventeenth lens element $L_{17}$ that is biconcave having surfaces of different curvature and with its surface of greater curvature on the image side intimately bonded to an eighteenth lens element $L_{18}$ that is biconvex having surfaces of different curvature and with its surface of lesser curvature on the image side intimately bonded to a nineteenth lens element $L_{19}$ that is biconcave having surfaces of different curvature and with its surface of greater curvature on the object side; a twentieth lens element $L_{20}$ of positive refractive power and a meniscus shape with its convex surface on the image side; a twenty-first lens element $L_{21}$ that is biconvex having surfaces of different curvature and with its surface of greater curvature on the object side; a twenty-second lens element $L_{22}$ of negative refractive power and a meniscus shape with its convex lens surface on the object side; a twenty-third lens element $L_3$ that is biconvex having lens surfaces of different curvature and with its lens surface of greater curvature on the object side; a doublet component formed of a twenty-fourth lens element $L_{24}$ of negative refractive power and a meniscus shape with its concave surface on the image side intimately bonded to a twenty-fifth lens element $L_{25}$ that is biconvex having surfaces of different curvature and with its surface of greater curvature on the object side; and a doublet component formed of a twenty-sixth lens element $L_{26}$ of negative refractive power and a meniscus shape with its concave lens surface on the image side intimately bonded to a twenty-seventh lens element $L_{27}$ that is biconvex having surfaces of different curvature and with its lens surface of greater curvature on the object side.

As shown in FIGS. 1 and 2, a diaphragm 3 is positioned between the third lens group $G_3$ and the fourth lens group $G_4$, and a three-color separating optical system 2, such as a prism, is positioned on the image side of the fourth lens group $G_4$.

Table 1 below lists the surface number #, in order from the object side, the radius of curvature R (in mm) of each surface, the on-axis surface spacing D (in mm), as well as the refractive index $N_e$ (at the e-line of 546.1 nm) and the Abbe number $v_d$ (at the d-line of 587.6 nm) of each lens element for Embodiment 1.

TABLE 1

| # | R | D | $N_e$ | $v_d$ |
|---|---|---|---|---|
| 1 | −4912.124 | 4.400 | 1.80399 | 42.3 |
| 2 | 299.435 | 1.626 | | |
| 3 | 297.782 | 32.290 | 1.43497 | 95.1 |
| 4 | −399.929 | 27.500 | | |
| 5 | 306.113 | 17.553 | 1.43497 | 95.1 |
| 6 | 22096.994 | 0.250 | | |
| 7 | 220.084 | 18.123 | 1.43497 | 95.1 |
| 8 | 800.361 | 0.250 | | |
| 9 | 251.006 | 13.900 | 1.43986 | 95.0 |
| 10 | 672.412 | $D_{10}$ (variable) | | |
| 11 | 2284.957 | 2.100 | 1.88813 | 40.9 |
| 12 | 64.827 | 6.885 | | |
| 13 | −181.423 | 2.050 | 1.82016 | 46.7 |
| 14 | 138.032 | 4.603 | | |
| 15 | −116.419 | 2.020 | 1.72056 | 47.9 |
| 16 | 58.867 | 6.960 | 1.85500 | 23.9 |
| 17 | 214.852 | 0.200 | | |
| 18 | 114.248 | 9.359 | 1.81643 | 22.8 |
| 19 | −93.849 | 2.000 | 1.80399 | 47.5 |
| 20 | 122.890 | $D_{20}$ (variable) | | |
| 21 | −366.827 | 5.686 | 1.57098 | 71.3 |
| 22 | −135.290 | 0.200 | | |
| 23 | 398.667 | 2.300 | 1.85500 | 23.9 |
| 24 | 119.920 | 14.565 | 1.49846 | 81.5 |

TABLE 1-continued

| # | R | D | $N_e$ | $v_d$ |
|---|---|---|---|---|
| 25 | −174.190 | 0.200 | | |
| 26 | 139.073 | 9.424 | 1.43986 | 95.0 |
| 27 | −656.674 | 3.500 | | |
| 28 | 172.076 | 10.234 | 1.43986 | 95.0 |
| 29 | −260.402 | $D_{29}$ (variable) | | |
| 30 | ∞ (stop) | 9.500 | | |
| 31 | −66.487 | 1.700 | 1.75844 | 52.3 |
| 32 | 58.115 | 9.800 | 1.81265 | 25.4 |
| 33 | −78.213 | 1.700 | 1.80644 | 46.7 |
| 34 | 245.168 | 20.360 | | |
| 35 | −76.600 | 6.140 | 1.51825 | 64.1 |
| 36 | −64.918 | 11.700 | | |
| 37 | 84.826 | 6.550 | 1.48915 | 70.2 |
| 38 | −144.892 | 2.500 | | |
| 39 | 279.146 | 2.500 | 1.89334 | 39.2 |
| 40 | 43.884 | 2.300 | | |
| 41 | 43.996 | 11.110 | 1.51825 | 64.1 |
| 42 | −150.700 | 2.500 | | |
| 43 | 309.838 | 2.500 | 1.83931 | 37.2 |
| 44 | 46.404 | 14.400 | 1.48915 | 70.2 |
| 45 | −88.251 | 0.200 | | |
| 46 | 80.495 | 2.000 | 1.83946 | 42.7 |
| 47 | 39.005 | 8.600 | 1.52032 | 59.0 |
| 48 | −129.022 | 0.000 | | |
| 49 | ∞ | 21.540 | 1.51825 | 64.1 |
| 50 | ∞ | 33.000 | 1.58565 | 46.5 |
| 51 | ∞ | | | |

In the large zoom ratio, four-group zoom lens of Embodiment 1, the second lens group $G_2$ and the third lens group $G_3$ move during zooming. Therefore, the values of the on-axis spacings $D_{10}$, $D_{20}$, and $D_{29}$ between the lens groups change with zooming. Table 2 below lists the values of the variables $D_{10}$, $D_{20}$, and $D_{29}$ (i.e, the group spacings) at the wide-angle end (f=9.35 mm at the e-line of 546.1 nm) and at the telephoto end (f=902.28 at the e-line of 546.1 nm) for Embodiment 1.

TABLE 2

| f | $D_{10}$ | $D_{20}$ | $D_{29}$ |
|---|---|---|---|
| 9.35 | 2.821 | 313.968 | 4.660 |
| 902.28 | 198.528 | 6.617 | 116.304 |

The ratio of the focal length at the telephoto end divided by the focal length at the wide-angle end defines a zoom ratio of 96.5 for Embodiment 1.

The length L of the image formed on the image plane 1 of the zoom lens of Embodiment 1 is eleven. Embodiment 1 of the present invention satisfies Conditions (1)–(5) above, as is apparent from values of Table 1, Table 2, and L disclosed above.

Figures 3A, 3B:
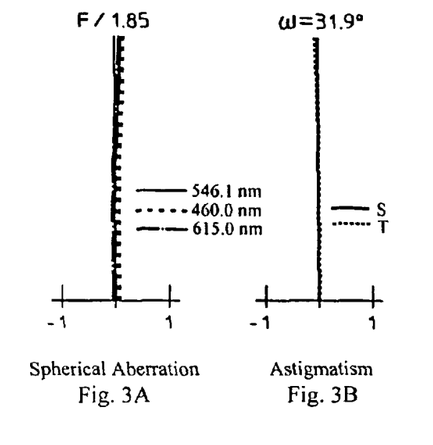
FIGS. 3A–3D show the spherical aberration, astigmatism, distortion, and lateral color, respectively, of the zoom lens according to Embodiment 1 at the wide-angle end.
Figure 3C:
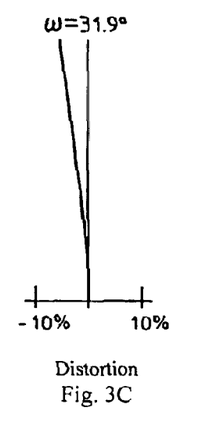
Figure 3D:
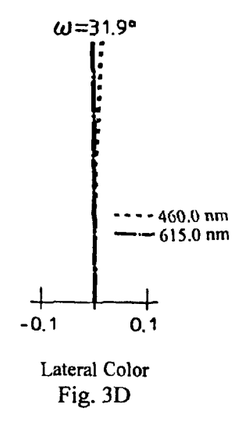
Figures 3E, 3F:
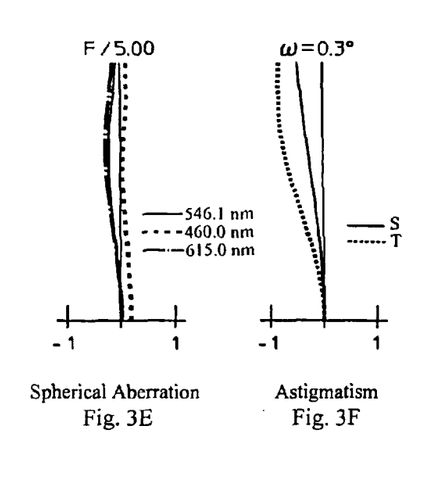
FIGS. 3E–3H show the spherical aberration, astigmatism, distortion, and lateral color, respectively, of the zoom lens according to Embodiment 1 at the telephoto end.
Figure 3G:
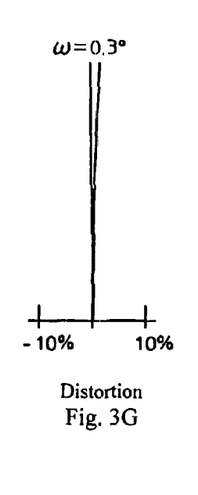
Figure 3H:
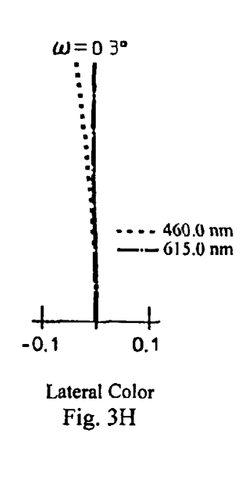

FIGS. 3A–3D show the spherical aberration, astigmatism, distortion, and lateral color, respectively, of the zoom lens of Embodiment 1 at the wide-angle end, having an f-number of 1.85. FIGS. 3E–3H show the spherical aberration, astigmatism, distortion, and lateral color, respectively, of the zoom lens of Embodiment 1 at the telephoto end having an f-number of 5.00. In FIGS. 3A and 3E, the spherical aberration is shown for the wavelengths 546.1 nm, 460.0 nm, and 615.0 nm. The spherical aberration, astigmatism, and lateral color are in units of mm, and ω is the half-field angle. In FIGS. 3B and 3F, the astigmatism is shown for the sagittal image surface S and the tangential image surface T. In FIGS. 3D and 3H, the lateral color is shown for the wavelengths 460.0 nm and 615.0 nm relative to the d-line. As is apparent from these figures, the various aberrations are favorably corrected over the entire zooming range.

Embodiment 2

Embodiment 2 is very similar to Embodiment 1 and therefore only the differences between Embodiment 2 and Embodiment 1 will be explained. In Embodiment 2, in the first lens group $G_1$, the first lens element $L_1$ is biconcave with radii of curvature on its two lens surfaces that are only slightly different in absolute value, the second lens element $L_2$ is biconvex with substantially different radii of curvature on its two lens surfaces, the third lens element $L_3$ is biconvex with different radii of curvature on its two lens surfaces and with its surface of larger radius of curvature on the object side.

Table 3 below lists the surface number #, in order from the object side, the radius of curvature R (in mm) of each surface, the on-axis surface spacing D (in mm), as well as the refractive index $N_e$ (at the e-line of 546.1 nm) and the Abbe number $v_d$ (at the d-line of 587.6 nm) of each lens element for Embodiment 2.

TABLE 3

| # | R | D | $N_e$ | $v_d$ |
|---|---|---|---|---|
| 1 | −485.470 | 4.400 | 1.80399 | 42.3 |
| 2 | 515.493 | 1.626 | | |
| 3 | 530.014 | 28.674 | 1.43497 | 95.1 |
| 4 | −305.627 | 27.500 | | |
| 5 | 564.960 | 17.767 | 1.43497 | 95.1 |
| 6 | −640.799 | 0.250 | | |
| 7 | 279.932 | 18.776 | 1.43497 | 95.1 |
| 8 | 77741.212 | 0.250 | | |
| 9 | 189.012 | 13.900 | 1.43986 | 95.0 |
| 10 | 448.311 | $D_{10}$ (variable) | | |
| 11 | −4629.909 | 2.100 | 1.88813 | 40.9 |
| 12 | 67.454 | 6.842 | | |
| 13 | −165.471 | 2.050 | 1.82016 | 46.7 |
| 14 | 141.626 | 4.653 | | |
| 15 | −111.893 | 2.020 | 1.72056 | 47.9 |
| 16 | 56.193 | 6.960 | 1.85500 | 23.9 |
| 17 | 278.966 | 0.200 | | |
| 18 | 103.338 | 10.195 | 1.81643 | 22.8 |
| 19 | −85.248 | 2.000 | 1.82016 | 46.7 |
| 20 | 109.470 | $D_{20}$ (variable) | | |
| 21 | −331.740 | 5.556 | 1.57098 | 71.3 |
| 22 | −132.790 | 0.200 | | |
| 23 | 422.303 | 2.300 | 1.85500 | 23.9 |
| 24 | 122.801 | 14.767 | 1.49846 | 81.5 |
| 25 | −162.494 | 0.200 | | |
| 26 | 143.633 | 9.369 | 1.43986 | 95.0 |
| 27 | −585.433 | 3.500 | | |
| 28 | 178.213 | 10.070 | 1.43986 | 95.0 |
| 29 | −258.326 | $D_{29}$ (variable) | | |
| 30 | ∞ (stop) | 9.500 | | |
| 31 | −66.424 | 1.700 | 1.75844 | 52.3 |
| 32 | 58.128 | 9.800 | 1.81265 | 25.4 |
| 33 | −78.182 | 1.700 | 1.80644 | 46.7 |
| 34 | 245.212 | 20.360 | | |
| 35 | −76.570 | 6.140 | 1.51825 | 64.1 |
| 36 | −64.499 | 11.700 | | |
| 37 | 84.860 | 6.550 | 1.48915 | 70.2 |
| 38 | −144.750 | 2.500 | | |
| 39 | 279.305 | 2.500 | 1.88814 | 40.8 |
| 40 | 43.884 | 2.300 | | |
| 41 | 44.015 | 11.110 | 1.51825 | 64.1 |
| 42 | −150.581 | 2.500 | | |
| 43 | 310.120 | 2.500 | 1.83931 | 37.2 |
| 44 | 46.414 | 14.400 | 1.48915 | 70.2 |
| 45 | −88.219 | 0.200 | | |
| 46 | 80.512 | 2.000 | 1.83946 | 42.7 |
| 47 | 39.013 | 8.600 | 1.52032 | 59.0 |
| 48 | −135.119 | 0.000 | | |
| 49 | ∞ | 21.540 | 1.51825 | 64.1 |
| 50 | ∞ | 33.000 | 1.58565 | 46.5 |
| 51 | ∞ | | | |

In the large zoom ratio, four-group zoom lens of Embodiment 2, the second lens group $G_2$ and the third lens group $G_3$ move during zooming. Therefore, the values of the on-axis spacings $D_{10}$, $D_{20}$, and $D_{29}$ between the lens groups change with zooming. Table 4 below lists the values of the variables $D_{10}$, $D_{20}$, and $D_{29}$ (i.e, the group spacings) at the wide-angle end (f=9.35 mm) and at the telephoto end (f=902.28) at the e-line (546.1 nm) for Embodiment 2.

TABLE 4

| f | $D_{10}$ | $D_{20}$ | $D_{29}$ |
|---|---|---|---|
| 9.35 | 18.722 | 313.655 | 4.660 |
| 902.28 | 214.430 | 6.303 | 116.304 |

The ratio of the focal length at the telephoto end divided by the focal length at the wide-angle end define a zoom ratio of 96.5 for Embodiment 2.

The length L of the image formed on the image plane 1 of the zoom lens of Embodiment 2 is 11 mm. Thus, Embodiment 2 of the present invention satisfies Conditions (1)–(5) above, as is apparent from comparing this value of L and the data set forth in Tables 3 and Table 4 with the Conditions (1)–(5).

Figure 4A:
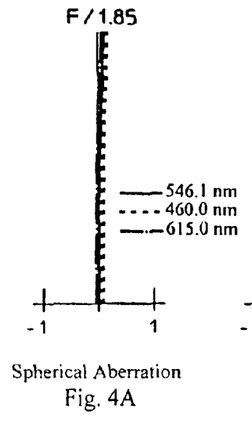
FIGS. 4A–4D show the spherical aberration, astigmatism, distortion, and lateral color, respectively, of the zoom lens according to Embodiment 2 at the wide-angle end.
Figure 4B:
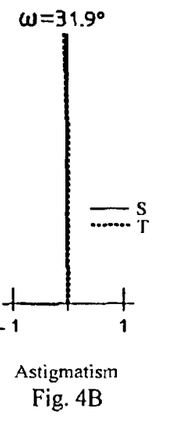
Figure 4C:
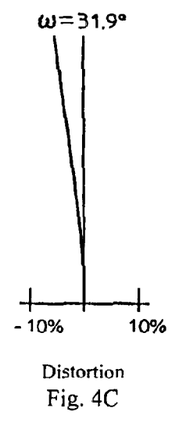
Figure 4D:
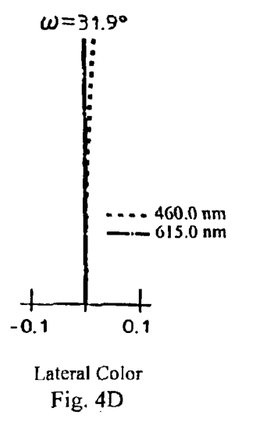
Figure 4E:
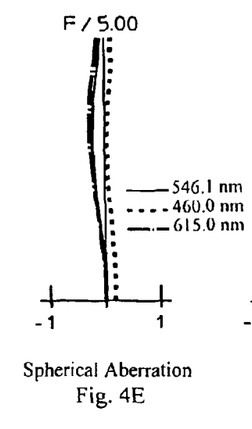
FIGS. 4E–4H show the spherical aberration, astigmatism, distortion, and lateral color, respectively, of the zoom lens according to Embodiment 2 at the telephoto end.
Figure 4F:
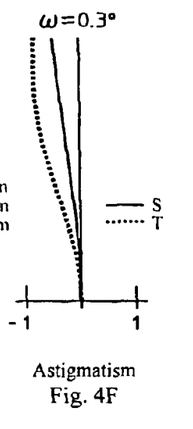
Figure 4G:
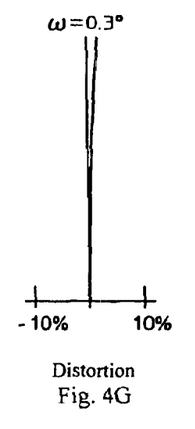
Figure 4H:
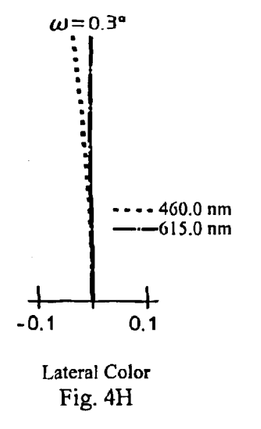

FIGS. 4A–4D show the spherical aberration, astigmatism, distortion, and lateral color, respectively, of the zoom lens of Embodiment 2 at the wide-angle end, having an f-number of 1.85. FIGS. 4E–4H show the spherical aberration, astigmatism, distortion, and lateral color, respectively, of the zoom lens of Embodiment 2 at the telephoto end having an f-number of 5.00. In FIGS. 4A and 4E, the spherical aberration is shown for the wavelengths 546.1 nm, 460.0 nm, and 615.0 nm. The spherical aberration, astigmatism, and lateral color are in units of mm, and ω is the half-field angle. In FIGS. 4B and 4F, the astigmatism is shown for the sagittal image surface S and the tangential image surface T. In FIGS. 4D and 4H, the lateral color is shown for the wavelengths 460.0 nm and 615.0 nm relative to the d-line. As is apparent from these figures, the various aberrations are favorably corrected over the entire zooming range.

The present invention is not limited to the aforementioned embodiments, as it will be obvious that various alternative implementations are possible. For instance, values such as the radius of curvature R of each of the lens components, the surface spacings D, the refractive index $N_e$, as well as the Abbe number $v_d$, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only four lens groups, in order from the object side along an optical axis, as follows:
    a first lens group having positive refractive power and that includes on the object side a biconcave lens element;
    a second lens group having negative refractive power;
    a third lens group having positive refractive power; and
    a fourth lens group having positive refractive power;
    wherein
    the first lens group and the fourth lens group do not move during zooming;
    the second lens group and the third lens group are moved along the optical axis during zooming; and the following conditions are satisfied:

$$L/f_w > 1.17$$

$$N_{L1} > 1.75$$

$$v_{L1} > 38$$

where
   L is the distance between two points of an image formed by the zoom lens on the image plane of the zoom lens that are diametrically opposite each other with respect to the optical axis of the zoom lens,
   $f_w$ is the focal length of the zoom lens at its wide-angle end,
   $N_{L1}$ is the refractive index at the e-line of the material of the object side lens element of the zoom lens, and
   $v_{L1}$ is the Abbe number at the d-line of the material of the object side lens element of the zoom lens.

2. The zoom lens of claim 1, wherein the following condition is satisfied:

$$-0.5 < (R_1 + R_2)/(R_1 - R_2) < 1.0$$

where
   $R_1$ is the radius of curvature of the lens surface on the object side of the object side lens element of the zoom lens, and
   $R_2$ is the radius of curvature of the lens surface on the image side of the object side lens element of the zoom lens.

3. The zoom lens of claim 2, wherein the following condition is satisfied:

$$v_{L2} - v_{L1} < 55$$

where
   $v_{L1}$ is the Abbe number at the d-line of the material of the object side lens element of the zoom lens, and
   $v_{L2}$ is the Abbe number at the d-line of the material of the second lens element from the object side of the zoom lens.

4. The zoom lens of claim 3, wherein the first lens group consists of, in order from the object side, a first lens component and four positive lens components.

5. The zoom lens of claim 4, wherein the first lens group consists of five lens elements.

6. The zoom lens of claim 3, wherein the zoom lens has a zoom ratio of greater than 70.

7. The zoom lens of claim 3, wherein the focal length of the zoom lens at the telephoto end is greater than 800 mm.

8. The zoom lens of claim 2, wherein the first lens group consists of, in order from the object side, a first lens component and four positive lens components.

9. The zoom lens of claim 8, wherein the first lens group consists of five lens elements.

10. The zoom lens of claim 2, wherein the zoom lens has a zoom ratio of greater than 70.

11. The zoom lens of claim 2, wherein the focal length of the zoom lens at the telephoto end is greater than 800 mm.

12. The zoom lens of claim 1, wherein the following condition is satisfied:

$$v_{L2} - v_{L1} < 55$$

where
   $v_{L1}$ is the Abbe number at the d-line of the material of the object side lens element of the zoom lens, and $v_{L2}$ is the Abbe number at the d-line of the material of the second lens element from the object side of the zoom lens.

13. The zoom lens of claim 12, wherein the first lens group consists of, in order from the object side, a first lens component and four positive lens components.

14. The zoom lens of claim 13, wherein the first lens group consists of five lens elements.

15. The zoom lens of claim 12, wherein the zoom lens has a zoom ratio of greater than 70.

16. The zoom lens of claim 12, wherein the focal length of the zoom lens at the telephoto end is greater than 800 mm.

17. The zoom lens of claim 1, wherein the first lens group consists of, in order from the object side, a first lens component and four positive lens components.

18. The zoom lens of claim 17, wherein the first lens group consists of five lens elements.

19. The zoom lens of claim 1, wherein the zoom lens has a zoom ratio of greater than 70.

20. The zoom lens of claim 1, wherein the focal length of the zoom lens at the telephoto end is greater than 800 mm.

* * * * *

UNITED STATES PATENT AND TRADEMARK OFFICE
CERTIFICATE OF CORRECTION

PATENT NO. : 6,940,656 B2
DATED : September 6, 2005
INVENTOR(S) : Oomura et al.

It is certified that error appears in the above-identified patent and that said Letters Patent is hereby corrected as shown below:

Column 6,
Line 17, change "element $L_3$" to -- element $L_{23}$ --.

Signed and Sealed this

Sixth Day of December, 2005

JON W. DUDAS
*Director of the United States Patent and Trademark Office*